(12) United States Patent
Lenick et al.

(10) Patent No.: US 7,306,375 B2
(45) Date of Patent: Dec. 11, 2007

(54) BEARING LOCKING COLLAR RETAINER

(75) Inventors: Louis J. Lenick, Mt. Prospect, IL (US); Brian A. Cohen, Wilmette, IL (US)

(73) Assignee: Peer Bearing Company, Waukegan, IL (US)

( * ) Notice: Subject to any disclaimer, the term of this patent is extended or adjusted under 35 U.S.C. 154(b) by 274 days.

(21) Appl. No.: 11/265,735

(22) Filed: Nov. 2, 2005

(65) Prior Publication Data

US 2007/0098314 A1    May 3, 2007

(51) Int. Cl.
*F16C 35/06* (2006.01)
(52) U.S. Cl. ................. 384/541; 384/537; 384/906
(58) Field of Classification Search ........... 384/537, 384/541, 542, 903, 906; 403/290, 344, 373
See application file for complete search history.

(56) References Cited

U.S. PATENT DOCUMENTS

| RE17,838 E | 10/1930 | Gayman |
| 1,898,469 A | 2/1933 | Tonsor |
| 2,136,819 A | 11/1938 | Large |
| 2,168,469 A | 8/1939 | Brouwer |
| 2,650,867 A | 9/1953 | Spieth |
| 3,276,828 A | 10/1966 | Mansfield |
| 3,304,140 A | 2/1967 | Homigold |
| 3,397,021 A | 8/1968 | Fitzsimmons |
| 3,428,379 A | 2/1969 | Readman |
| 3,588,208 A * | 6/1971 | Kane ........................ 384/541 |
| 3,938,901 A | 2/1976 | Howe, Jr. |
| 4,403,814 A * | 9/1983 | Koss et al. ................. 384/541 |
| 4,537,519 A * | 8/1985 | LaRou et al. ............... 384/478 |
| 4,575,265 A | 3/1986 | Tooley |
| 5,417,500 A * | 5/1995 | Martinie ..................... 384/513 |
| 5,863,137 A | 1/1999 | Johnson et al. |
| 6,840,679 B2 | 1/2005 | Lenick et al. |

FOREIGN PATENT DOCUMENTS

FR          513.495          2/1921

* cited by examiner

*Primary Examiner*—Thomas R. Hannon
(74) *Attorney, Agent, or Firm*—Cook, Alex, McFarron, Manzo, Cummings & Mehler, Ltd.

(57) ABSTRACT

A bearing assembly for a shaft including an inner ring that mounts on the shaft and an outer ring disposed concentrically about the inner ring. Ball bearings are interposed between the inner and outer rings. Fingers are formed on one side of the inner ring and they extend axially with adjacent fingers defining longitudinally extending slots. An outwardly opening notch is formed in each of the fingers to create an outwardly opening circumferential groove around the inner ring. A compressible annular locking collar is positioned circumferentially around the fingers. A fastener screw is operable to compress the fingers into locking engagement with the shaft. A first elongated locking rod extends through the locking collar and into an outwardly opening notch in one of the fingers to secure the locking collar against axial movement relative to the fingers. A second locking rod extends through the locking collar to fit into a slot between a pair of fingers to secure the locking collar against circumferential movement relative to the fingers.

6 Claims, 1 Drawing Sheet

BEARING LOCKING COLLAR RETAINER

BACKGROUND OF THE INVENTION

This invention is directed to a bearing assembly of the type which is equipped with a locking collar for mounting on a rotatable shaft. It is further directed to a bearing assembly in which the inner race of the bearing assembly is formed with slotted fingers which are bent against the shaft by a removable locking collar. Earlier bearing assemblies provided raised end portions on the slotted fingers of the inner race member which were engaged by a locking collar. An improved bearing assembly and locking collar utilized a locking collar formed with a larger inside diameter that is sized to fit over and engage the inner race member fingers and a smaller diameter which cooperates with the larger inside diameter to form a radial wall that engages the distal ends of the slotted fingers of the inner race member. This improved bearing assembly and locking collar is described in U.S. Pat. No. 6,840,679, which is incorporated in this specification by reference for all purposes.

The conventional bearing assembly and locking collar have, in the past, been shipped to customers in an unassembled condition which resulted in the locking collar becoming separated from the bearing assembly and increased the possibility that the locking collar could be mislaid or lost. Also, during installation, the locking collar could rotate about its inner race member. Further, during installation, the locking collar could tilt, twist or move axially relative to its inner race member making installation more difficult and resulting in the locking collar becoming loose on the inner race member after it was originally tightened. Even in instances where the tilted locking collar remained tightened, increased vibration has occurred due to the out of balance mounting of the locking collar. Attempts have been made in the art to correct these problems by providing the bearing assembly and locking collar with protrusions, threads and resilient locking rings which hold the locking collar on to the inner race member during shipping and installation. These attempts, although successful in maintaining the locking ring on the inner race member during shipping and assembly have not solved the problem of the locking collar rotating relative to the inner race member or the locking collar tilting relative to the inner race member. Further, these complex and additional manufacturing steps and additional items have increased the complexity and thus the cost of the bearing assembly and locking ring.

SUMMARY OF THE INVENTION

The present invention provides a bearing assembly and locking collar in which the locking collar is positively attached to its inner raceway during shipping and assembly to prevent rotation, tilting and twisting of the locking collar relative to its inner race member.

An object of this invention is a bearing assembly and locking collar in which the positive attachment of the locking collar to its inner race member during shipping and assembly is provided by locking rods which extend through the collar and engage fingers of the inner race member.

Another object of this invention is a removable locking collar which carries its pre-aligned locking rods with it during shipment and installation.

An additional object of this invention is a locking rod embodied in a grub screw which is removable if desired, is inexpensive, readily available and eliminates the danger of a protruding head when the locking rod is installed on a rotatable locking collar.

Other objects and advantages of this invention may be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

Figure 1:
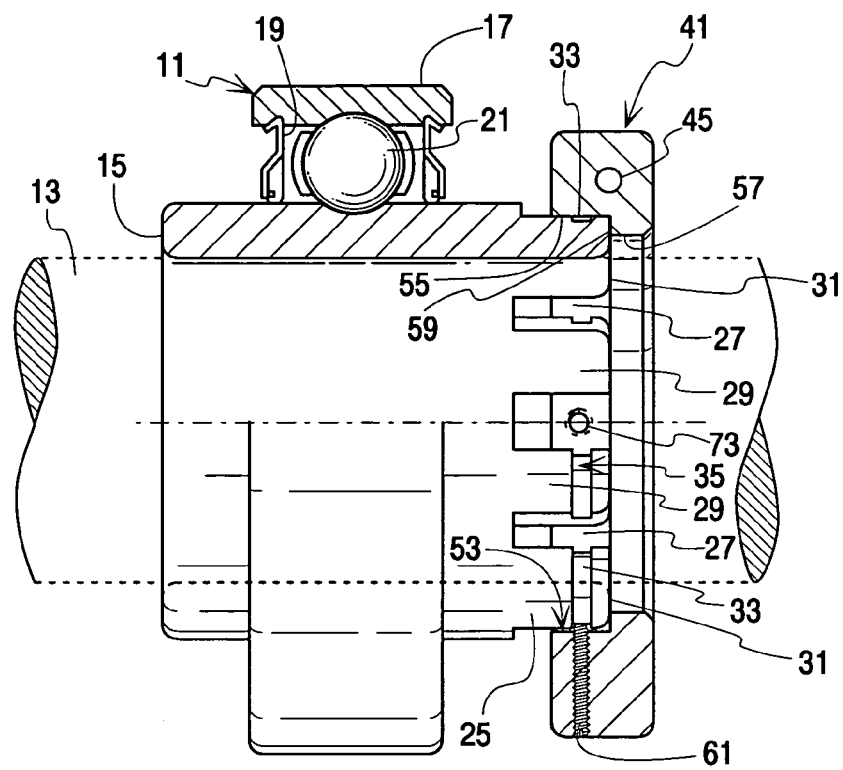
FIG. 1 is an elevational view of the bearing assembly and locking collar of this invention shown partially in axial cross section and mounted on a shaft which is shown partially in phantom lines.

The drawings show a bearing assembly 11 mounted on a shaft 13 which is shown partially in phantom lines. The bearing assembly 11 includes an annular inner race member 15 surrounded by an outer race member 17 with an annulus 19 defined between the inner and outer race members. Bearing members, in this case ball bearings 21, ride in grooves formed in both the inner and outer race members. As is conventional, the bearing assembly may include a lubricating passage extending through the outer race member. Inner and outer flingers with annular seals may be prepressed between the inner and outer race members to seal the bearing members 21. However, it should be understood and appreciated that the invention may be applied to other types of bearings which do not have lubricating passages or flingers and seals. The inner race member 15 is formed with an axial extension 25 of reduced thickness. Longitudinally extending slots 27 formed in this axial extension define fingers 29 which terminate in distal end walls 31. Radially outwardly opening notches 33 are formed in the fingers 29. The notches are aligned to form a continuous interrupted groove 35 circumferentially around the fingers.

To secure the bearing assembly 11 to the rotatable shaft 13, a locking collar 41 is provided. The locking collar fits over the axial extension 25 to force the fingers 29 of the axial extension against the rotatable shaft 13 when the collar is tightened. The locking collar is tightenable because of the formation of a diametrically extending gap 43 therein. A smooth passage 45 is formed in the locking collar on one side of the gap 43 and this passage aligns with a threaded passage 47 formed in the locking collar on the opposite side of the gap. A recess 49 to receive the head of a cap screw 51 is formed in the locking collar 41. The cap screw 51 is located in the recess 49 and with its threads extending through the smooth passage 45 and into engagement with the threaded passage 47 to permit tightening of the locking collar through diminution of the gap 43. A recess 50, similar in shape to recess 49, is formed in the locking collar to provide access to the threaded passage 47.

The locking collar 41 is formed with a bore 53 having a larger diameter 55 and a smaller inner diameter 57 separated by an annular radial stop wall 59. The axial length of the larger diameter 55 may be varied to change the amount the locking collar overlies the fingers 29 and thus adjusts the area and location of gripping contact between the locking collar and the fingers.

When the locking collar is positioned over the axially extending fingers 29 of the inner race member 15, the annular radial stop wall 59 engages the distal end walls 31 of the fingers 29 as shown in FIG. 1 of the drawings. The larger outer diameter 55 of the locking collar engages the fingers 29 adjacent the outer ends thereof to press the outer ends of the fingers against the shaft 13. The annular radial stop walls 59 of the locking collar 41 not only position the locking collar on the axial extension 25 of the inner race member 15 but also determine the extended engagement of the locking collar with the outer ends of the fingers 29.

Figure 2:
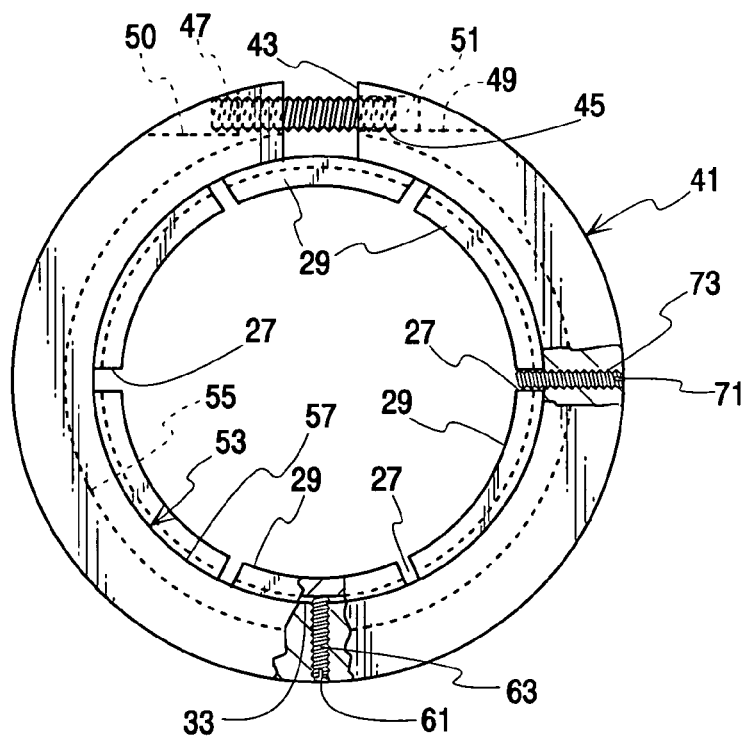
FIG. 2 is an end view of the bearing assembly and locking collar of FIG. 1 with some parts shown in dashed lines and some parts broken away for clarity of illustration.

The locking collar 41 is positioned over the axially extending fingers 29 of the inner race member 15 when the bearing assembly is shipped to the person who installs it on a shaft 13. However, during shipping the locking collar is not fully tightened against the fingers because the bearing assembly has not as yet been installed on the shaft. In this loosen condition, the locking collar can move axially along the lengths of the axial extensions 25 of the fingers 29 and tilt relative thereto. To prevent this unwanted and undesirable axial movement and tilting, an insertable locking rod is provided. In this embodiment of the invention, the locking rod is a grub screw 61 which threads through a threaded passage 63 formed in the locking collar 41 and extends into a notch 33 of one of the fingers 29. The grub screw in this embodiment of the invention is formed of nylon but it should be understood and appreciated that other materials either plastic or metal may be used in place of nylon. As can be viewed in FIGS. 1 and 2 of the drawings, the threaded passage 63 is formed in the locking collar 41 at a location 180° relative to the location of the diametric gap 43 in the locking collar which is closed by the cap screw 51. While this location of the threaded passage 63 at 180° is optimal for preventing collar tilt or twist during tightening of the locking collar by the cap screw 51, it should be understood and appreciated that the threaded passage 63 may be located anywhere within a sector extending 90° to 270° relative to the diametric gap 43.

During shipping and during installation of the bearing assembly 11 on a shaft 13, the locking collar 41 can also rotate relative to the fingers 29. To prevent this unwanted rotation, an additional insertable locking rod is provided. In this embodiment, the additional locking rod is a grub screw 71, identical to grub screw 61, which threads through a threaded passage 73 formed in the locking collar 41 and extends into a longitudinally extending slot 27 formed between a pair of fingers 29. As viewed in FIGS. 1 and 2 of the drawings, the threaded passage 73 is positioned in the locking collar at a location 90° relative to the location of the diametric gap 43 in the locking collar. For ease of installation, the grub screw 71 is usually inserted into the slot 27 between a pair of fingers before the grub screw 61 is installed. The additional grub screw's threaded passage 73 is not limited to this specific location but it should be provided where it will not interfere with the cap screw 51 or the previously mentioned grub screw 61.

While the grub screw is the preferred form of locking rod because of its inexpensive cost and ready availability as well as its lack of a protruding head which could be dangerous on rotating elements, it should be understood and appreciated that other insertable locking rods may be used. The grub screw with its threads extending along its entire length permits withdrawal from engagement with the fingers of the inner race member so that the locking ring can be removed from engagement with the inner race member yet allows the grub screw to be retained in its threaded passage in position on the locking collar for reengagement. Further, if the end of the grub screw projects beyond the outer surface of the locking collar 41, the projecting portion can easily be removed by any conventional mechanical process such as breaking, grinding, sanding, etc., to preventing injury to a worker near the rotating shaft.

The invention claimed is:

1. A bearing assembly comprising:
an inner ring for mounting on a shaft,
an outer ring disposed concentrically about said inner ring, a plurality of roller elements interposed between said inner and outer rings, said inner ring including a plurality of fingers extending axially from a side thereof,
adjacent fingers of said plurality of fingers defining longitudinally extending slots between said fingers,
an outwardly opening notch formed in each of said fingers to create an outwardly opening circumferential groove around said inner ring,
a compressible annular locking collar positioned circumferentially about said fingers,
said locking collar being tightenable to compress said fingers into locking engagement with said shaft, and
a first elongated locking rod extending through said locking collar and into an outwardly opening notch in one of said fingers to secure said locking collar against movement relative to said fingers.

2. The bearing assembly of claim 1 further including a second elongated locking rod extending through said locking collar to fit into a longitudinally extending slot between one of said pairs of adjacent fingers to secure said locking collar against circumferential movement relative to said fingers.

3. The bearing assembly of claim 2 in which said elongated locking rod is a grub screw.

4. The bearing assembly of claim 1 in which said elongated locking rod is a grub screw.

5. The bearing assembly of claim 1 in which said first elongated locking rod is positioned at a location 180° relative to said locking collar fastener screw.

6. The bearing assembly of claim 5 in which a second elongated locking rod which extends through said locking collar to fit into a longitudinally extending slot between one of said pairs of adjacent fingers to secure said locking collar against circumferential movement relative to said fingers is positioned at a location 90° relative to said first elongated locking rod.

* * * * *